No. 629,745. Patented July 25, 1899.
J. F. & L. GOMMERET.
WHEEL TIRE.
(Application filed Mar. 6, 1899.)
(No Model.) 2 Sheets—Sheet 1.
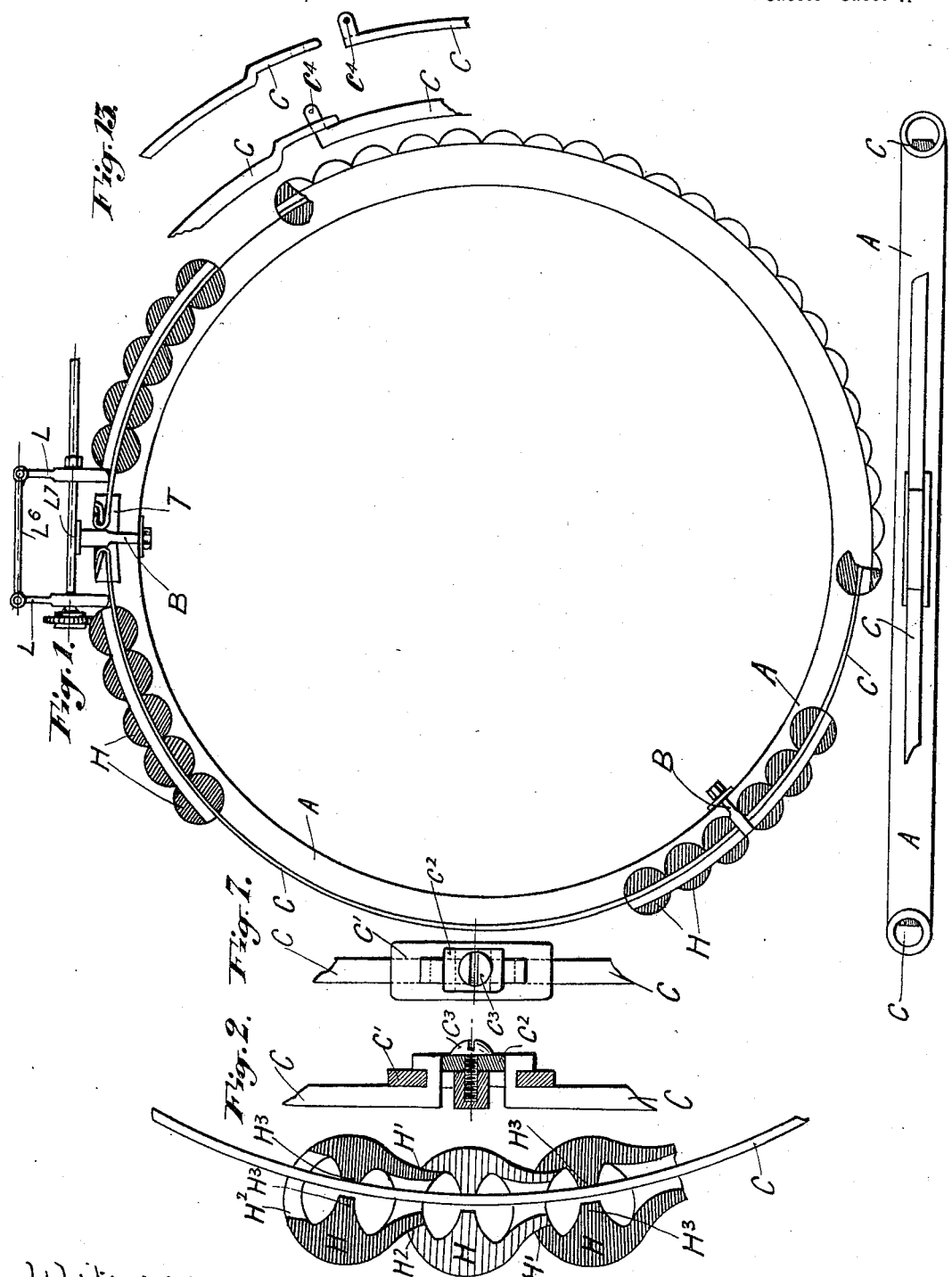

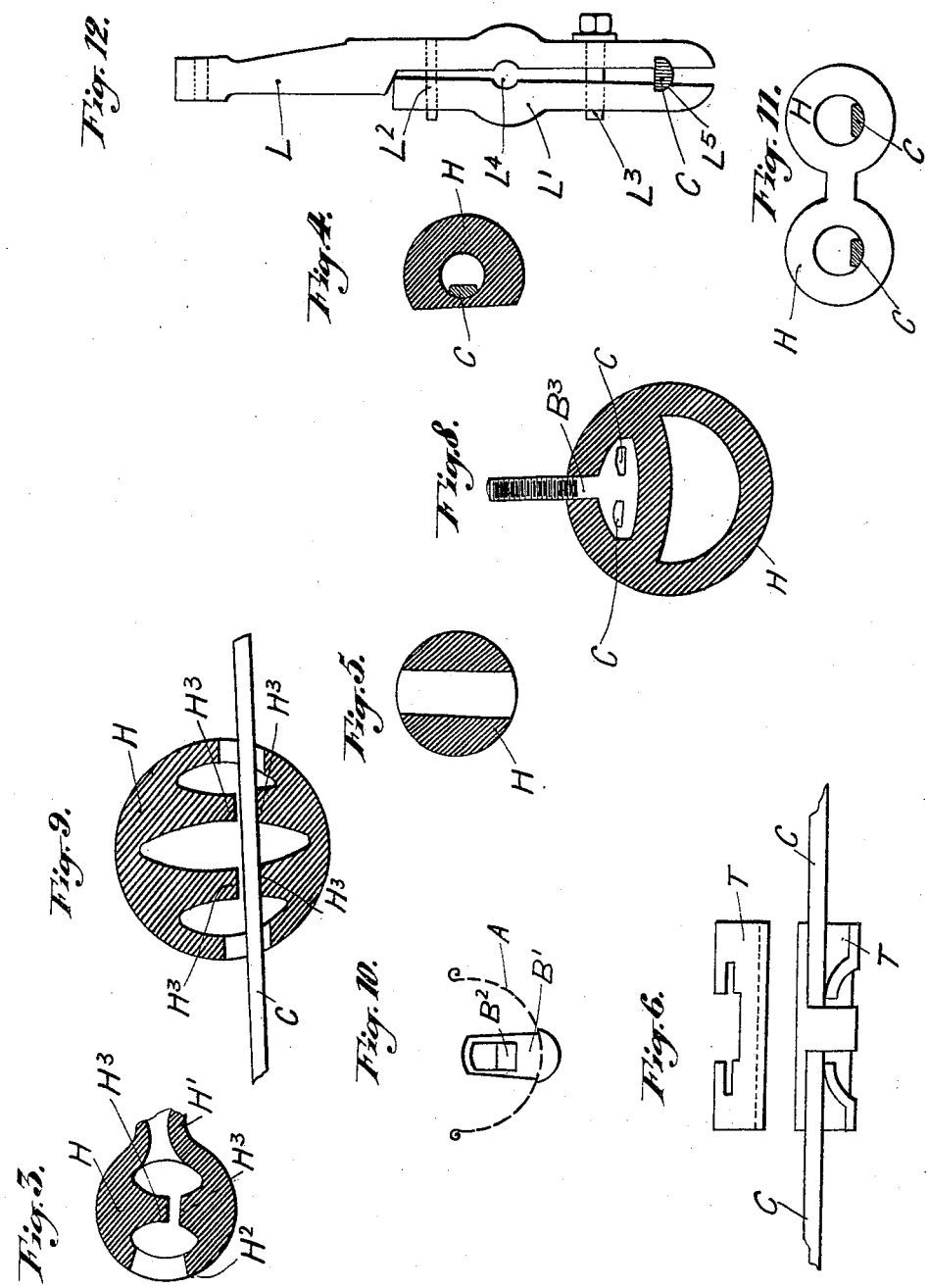

UNITED STATES PATENT OFFICE.

JEAN FRANCOIS GOMMERET AND LÉON GOMMERET, OF TROYES, FRANCE.

WHEEL-TIRE.

SPECIFICATION forming part of Letters Patent No. 629,745, dated July 25, 1899.

Application filed March 6, 1899. Serial No. 708,098. (No model.)

*To all whom it may concern:*

Be it known that we, JEAN FRANCOIS GOMMERET and LÉON GOMMERET, citizens of the Republic of France, residing at Troyes, Department of Aube, France, have invented certain new and useful Improvements in Wheel-Tires, of which the following is a specification.

Our invention relates to wheel-tires, the object being to provide an improved rubber tire applicable to any kind of vehicle-wheel and formed of a plurality of rubber spheroids or balls made of suitable shape and dimensions and hollowed out to be slipped upon a circular metal band and telescoped into each other, said metal band being properly secured to the rim of the wheel; and it consists in the particular features of construction and combination of parts hereinafter fully described and claimed.

In order that our invention may be fully understood and carried into practical effect, reference is hereby made to the accompanying drawings, illustrating our invention in several views, and in which—

Figure 1 is a sectional view in elevation and plan of a wheel-rim provided with the improved rubber tire. Fig. 2 shows a series of rubber spheroids or balls intended for light bicycle-wheels. Fig. 3 shows a detached spheroid or ball in section. Fig. 4 is a section of a rubber sphere or ball for flat wheel-rims. Fig. 5 is a view of the tubular coupling serving to connect the ends of the circular metal band. Fig. 6 shows a modified form of coupling for connecting said ends together. Fig. 7 is a section of a rubber spheroid or ball for heavy wheel-rims. Fig. 8 is a section of a rubber sphere or ball having two inner bearing-points. Fig. 9 shows a rivet and the manner in which the metal band may be secured to the wheel-rim. Fig. 10 shows a double sphere or ball. Fig. 11 shows still another manner for connecting the ends of the circular metal band.

In the drawings like letters refer to like parts throughout all the figures.

The characteristic feature of our invention consists in providing a plurality of hollow rubber spheroids or balls H, adapted to be slipped upon a metal band C, which may be secured to the wheel-rim A in any suitable way— *i. e.*, by means of eyebolts B, Fig. 1, or rivets B', Fig. 10, the ends $B^2$ of which are slotted to receive said metal band, or bolts $B^3$, Fig. 8, the heads of which are provided with two openings to receive metal bands C, as shown.

The rubber spheroids or balls H, which may be made of any suitable form, are preferably formed with a reduced tapered and tubular portion H' and the opposite side being provided with a tapered or conical aperture $H^2$, said tubular end of one spheroid or ball being adapted to enter and fit into the aperture of the next spheroid or ball, as shown in Fig. 2. As already stated, said spheroids or balls H are hollowed out and provided internally with one or more opposing lugs or ribs, such as $H^3$, Figs. 2, 3, and 9, adapted to be pressed upon the metal band C when in use. It is obvious that the number of said ribs will be determined in accordance with the load to be supported by the wheel to which the tire is to be applied. For heavy tires the spheroids or balls shown in Figs. 8 and 11 may be employed. In the form shown in Fig. 8 the balls are fitted on two metal bands C C, and in the form shown in Fig. 11 said balls are arranged in pairs, preferably made integrally with each other and also fitted on two metal bands C C. Various other forms of balls or spheroids may be resorted to without departing from the spirit of our invention. After the rubber balls H have been fitted on said metal band or bands C and telescoped into each other, as indicated, the ends of said metal band or bands are attached together in any suitable way. This may be done by means of a tubular coupling T, Figs. 1 and 6, slotted or slit, as shown, to receive the hooked ends of said metal band, whereupon said tube T will be flattened, so as to securely hold said hooks from slipping out of same. The ends of said metal band C may also be attached together by means of a slotted plate C', adapted to receive the hooked ends of the metal band C, which ends are prevented from becoming detached by a rectangular plate $C^2$, secured to a central extension of said plate C' by means of a screw $C^3$ or in any suitable way, or said ends may be attached together as shown in the drawings, a pin $c^4$, passed through one of said ends, securing the connection thereof.

From the aforegoing construction it will be readily seen that our improved wheel-tire will be very smooth in operation, take up all vibrations of the wheel, and prevent sliding or slipping of the same. Furthermore, said wheel-tire will be of much longer life and more easy to repair than the pneumatic tires hitherto in use.

Having thus described our invention, what we claim, and desire to secure by Letters Patent, is—

1. An improved wheel-tire, composed of a series of individual rubber spheres or balls, hollowed out and provided with internal opposing extensions, said spheres or balls fitted on a circular metal band suitably secured to the rim of the wheel, substantially as set forth.

2. An improved wheel-tire, composed of a series of individual rubber spheres or balls, hollowed out and provided with internal opposing extensions, said spheres or balls being formed with a reduced tapered and tubular portion and having an opposite tapered aperture, and means for holding said spheres or balls on the rim of the wheel, substantially as set forth.

3. In an improved wheel-tire, the combination with individual rubber spheres or balls, having tapering tubular portions on one side and tapering tubular apertures on the opposite side, of a metal or other band, secured to the rim of the wheel by means of eyebolts or special rivets, and means for securely attaching the ends of said circular band together after the spheres or balls have been fitted thereon, substantially as set forth.

4. In combination with the metal band for wheel-tires of the character described, a device for attaching the ends thereof together, consisting of an apertured plate receiving the hooked ends of said circular band, and a second plate suitably secured to the former, substantially as set forth.

In testimony whereof we affix our signatures in presence of two witnesses.

JEAN FRANCOIS GOMMERET.
LÉON GOMMERET.

Witnesses:
 BERTHAUT ELYSÉE,
 LONGNION CHARLES.